US008643489B2

(12) United States Patent
Ohsawa (10) Patent No.: US 8,643,489 B2
(45) Date of Patent: Feb. 4, 2014

(54) IMAGE PROCESSING SYSTEM, HISTORY MANAGEMENT APPARATUS, IMAGE PROCESSING CONTROL APPARATUS AND COMPUTER READABLE MEDIUM (75) Inventor: Takashi Ohsawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1139 days.

(21) Appl. No.: 12/559,906

(22) Filed: Sep. 15, 2009

(65) Prior Publication Data
US 2010/0237993 A1 Sep. 23, 2010

(30) Foreign Application Priority Data

Mar. 18, 2009 (JP) ................................. 2009-066840

(51) Int. Cl.
G08B 13/14 (2006.01)
(52) U.S. Cl.
USPC ....... 340/572.1; 235/375; 235/379; 340/10.1; 340/5.3; 340/5.31; 340/5.8; 340/5.86; 358/1.14; 358/3.28; 358/400; 382/100; 382/101; 382/112; 382/135; 382/137
(58) Field of Classification Search
None
See application file for complete search history.

(56) References Cited

U.S. PATENT DOCUMENTS

| 8,199,339 | B2 * | 6/2012 | Ihara ............................ 358/1.14 |
| 2005/0013640 | A1 * | 1/2005 | Kumakura et al. ........... 399/366 |
| 2006/0290967 | A1 * | 12/2006 | Sumitomo et al. ........... 358/1.14 |
| 2008/0008318 | A1 * | 1/2008 | Kinoshita ..................... 380/217 |
| 2008/0037071 | A1 | 2/2008 | Ohta |
| 2008/0111660 | A1 * | 5/2008 | Kim et al. .................... 340/5.86 |
| 2008/0288453 | A1 * | 11/2008 | Smetters et al. .................. 707/3 |
| 2008/0304098 | A1 * | 12/2008 | Fuse et al. .................... 358/1.15 |

FOREIGN PATENT DOCUMENTS

| CN | 1885892 A | 12/2006 |
| JP | 08-018772 A | 1/1996 |
| JP | 2005-151337 A | 6/2005 |
| JP | 2008-11477 A | 1/2008 |
| JP | 2008-42666 A | 2/2008 |
| JP | 2008-131522 A | 6/2008 |
| JP | 2008-271099 A | 11/2008 |

OTHER PUBLICATIONS

"Ridoc IO JBPrint", Ricoh Company, Ltd., Aug. 2007.
"Output Log Management Solution", Canon Inc./Canon Marketing Japan Inc., Apr. 2009.
"Report Chaser", Canon Marketing Japan Inc., Apr. 2006.

(Continued)

Primary Examiner — Benjamin C Lee
Assistant Examiner — Curtis King
(74) Attorney, Agent, or Firm — Sughrue Mion, PLLC (57) ABSTRACT A history management apparatus includes: a storage unit that stores history information of image processing which contains set-membership information containing pieces of document identification information of an input document and an output document, and an image of at least one of the input document and the output document as history information; and a notification unit that, when history information in which a surveillance target element is contained in an image of an input document or an image of an output document is detected from the storage unit, notifies a notified party of such as the detected history information. When the surveillance target element is not contained in both of the images in the history information, and it is identified that at least one of ancestral documents of the input document has the surveillance target element, the notification unit notifies the notified party of the history information.

20 Claims, 8 Drawing Sheets (56) References Cited

OTHER PUBLICATIONS

"Job Archive System" News Release, Canon Inc./Canon Marketing Japan Inc., Jun. 28, 2005.
"ImageWARE Secure Audit Manager" Press Release, Canon U.S.A. Inc., Jun. 12, 2007.
Japanese Office Action issued Feb. 19, 2013 in Japanese Application No. 2009-066840.
Office Action issued by the People's Republic of China dated Jul. 22, 2013 in Corresponding Application No. 200910205565.2.

* cited by examiner

IMAGE PROCESSING SYSTEM, HISTORY MANAGEMENT APPARATUS, IMAGE PROCESSING CONTROL APPARATUS AND COMPUTER READABLE MEDIUM

CROSS-REFERENCE TO RELATED APPLICATIONS

This application is based on and claims priority under 35 USC 119 from Japanese Patent Application No. 2009-066840 filed on Mar. 18, 2009.

BACKGROUND

Technical Field

The present invention relates to an image processing system, a history management apparatus, an image processing control apparatus and a computer readable medium.

SUMMARY

According to an aspect of the invention, an image processing system includes: a detection unit that detects document identification information from an input document; an output unit that executes image processing on the input document, and appends unique document identification information to an output document serving as an execution result of the image processing, to output the output document; a storage unit that stores history information of the image processing, wherein the history information contains (i) set-membership information containing the document identification information of the input document and the document identification information of the output document, and (ii) an image of the input document or an image of the output document, or both of the images; and a notification unit that, when history information in which a surveillance target element is contained in an image of an input document or an image of an output document is detected from the storage unit, notifies a notified party determined in advance of the detected history information or information which indicates the history information is detected. Ancestral documents are specified based on the set-membership information contained in other respective pieces of history information stored in the storage unit. And even in the case in which the surveillance target element is not contained in both of the image of the input document and the image of the output document in the history information, and when it is identified that at least one of the ancestral documents of the input document has the surveillance target element, the notification unit notifies the notified party of the history information or the information that indicates the history information is detected.

BRIEF DESCRIPTION OF THE DRAWINGS

Exemplary embodiment(s) of the present invention will be described in detail based on the following figures, wherein.

DETAILED DESCRIPTION

First, an example of a system of this exemplary embodiment will be described with reference to FIG. 1. This system includes one or more image processing apparatuses 200, and a log management apparatus 100 that collects and manages logs of image processings from the respective image processing apparatuses 200.

The image processing apparatuses 200 are apparatuses such as printers, scanners, digital copiers, facsimile devices, digital multi function peripherals having two or more functions thereof, and the like. Image processings executed by the image processing apparatuses 200 contain one or more processings of, for example, printing of electronic documents (document data), copying of paper documents, reading (scanning) of paper documents, facsimile transmission of paper documents or electronic documents, and the like. In each case, for image processing, an input document serving as an object thereof is input to an image processing apparatus, and an output document is output as a result of the image processing. An input document and an output document may be an electronic document and/or a paper document. For example, in the case of print processing, the input document is an electronic document, and the output document is a paper document.

In the image processing apparatus 200, an output processing unit 206 is a device that executes image processing on an input document, to output an output document. That is, a portion executing processings such as printing, scanning, copying, facsimile transmission, and the like is the output processing unit 206. An ID generating unit 202 generates unique identification information (called document ID) for an output document which is a result of image processing. A document ID is unique in, not only the image processing apparatus 200, but also the entire system. An ID appending unit 204 executes processing for appending a document ID generated by the ID generating unit 202 to an output document. In the case in which an output document is a paper document, appending of a document ID may be realized by, for example, printing an image code such as a bar-code denoting the document ID on the output document, or appending or superimposing the image code on an image of the output document, to print it. Further, in the case in which an image of an output document is printed on a sheet to which a micro tag having a storage device such as an RFID tag is attached (or watermarked), a document ID may be stored in the tag to be appended to the output document. Further, in the case in which an output document is an electronic document, in the same way as a paper document, an image code of a document ID may be incorporated in an image of the output document, or a document ID may be incorporated as an item of attribute data or metadata of the output document.

A log notification unit 208 generates a log record of image processing executed by the image processing apparatus 200, and notifies the log management apparatus 100 of the log. The timing of a notification of a log record to the log management apparatus 100 may be appropriately determined. For example, a notification of a log record may be given every time image processing is executed, or may be given periodically, for example, at regular time intervals, or may be given every time an accumulated data amount of a log record reaches a threshold value. FIG. 2 shows an example of data content of a log record generated by the log notification unit 208. In this example, the log record contains a processing log 250 and an image log 270.

The processing log 250 is a log in which attributes associated with image processing are recorded. In the processing log 250, a log ID 252 is unique identification information of the log record. A date 254 is representatively a date on which the image processing is executed. In the case in which requested image processing is not executed due to a surveillance condition which will be described later, a date on which cancellation of execution is determined may be recorded as the date 254. A device ID 256 is unique identification information on the image processing apparatus 200 itself, and a user ID 258 is unique identification information on a user who has requested to execute the image processing. Note that the user ID 258 may be acquired by carrying out personal authentication of a user requesting processing. For example, a mechanism may be created such that a card reader is provided to the image processing apparatus 200, and a user is required to load an ID card into the card reader when requesting processing. A processing type 260 is information denoting a type of the image processing. As types, there are "printing," "copying," "scanning," "facsimile transmission," and the like, for example. A processing parameter 262 is one or more parameters to regulate the content of the image processing. There are various parameters for image processing. However, only parameters designated in advance to be recorded in the log from among those are contained in the processing parameter 262. For example, in the case of facsimile transmission, a destination number is an example thereof. An input document ID 264 is a document ID of an input document input as an object of the image processing. In order to record the input document ID 264, the image processing apparatus 200 includes a function of reading a document ID from an input document. This function corresponds to a manner of appending a document ID to a document. For example, in the case in which a method for printing an image code denoting a document ID on a document is used, the reading function is to recognize the image code of the document ID from the read image of the input document. An output document ID 266 is a document ID provided to an output document which is a result of the image processing. A pair of the input document ID 264 and the output document ID 266 shows the set membership (derived relationship) between the documents. The pair of the input document ID 264 and the output document ID 266 among the respective items in the processing log 250 described above is used for processing of the present exemplary embodiment. The other items may be sorted out for different purposes of log surveillance. It is a matter of course that items other than those exemplified may be incorporated in the processing log 250.

The image log 270 is a log in which an image of an input document serving as an object of the image processing, an image of an output document serving as a result of the image processing, or both of those are stored in a predetermined data format (for example, PDF: Portable Document File). For example, in the case of image processing such as scanning, copying, or facsimile transmission, an image obtained as a result of reading a paper input document can be used as the image log 270. Further, in the case of image processing such as printing, an image generated from print data received from a client computer can be used as the image log 270. Note that, because a read image itself or an image to be printed itself has an extremely high resolution, the image log 270 is not necessarily such an image itself, but may be an image whose resolution is reduced.

Note that an image log analysis result 268 contained in the processing log 250 is data on an analysis result of the image logs 270 in an image log analysis unit 108 of the log management apparatus 100 which will be described later. Accordingly, this item does not exist in a log record generated by the log notification unit 208 of the image processing apparatus 200. However, in the case in which the image processing apparatus 200 analyzes in the same way as the image log analysis unit 108, the log notification unit 208 generates a log record containing this item. The image log analysis result 268 will be described in detail later.

To return to the description of FIG. 1 again, the log management apparatus 100 receives log record groups from the respective image processing apparatuses 200 under the control thereof, to store those log record groups, and analyzes the stored log record groups to notify an administrator of the results.

In the log management apparatus 100, a receiving unit 102 receives log records transmitted from the respective image processing apparatuses 200. A log processing unit 104 executes processings such as analysis, which is for registering those with a log DB 114, with respect to the log records received by the receiving unit 102. A processing log analysis unit 106 in the log processing unit 104 extracts values of the respective items in the processing logs 250 from the log records, to deliver those to a registration unit 112. The image log analysis unit 108 analyzes the image logs 270 in the log records, and detects surveillance target keywords or the like stored in a keyword storage unit 110 from among the images of the image logs 270.

Figure 3:
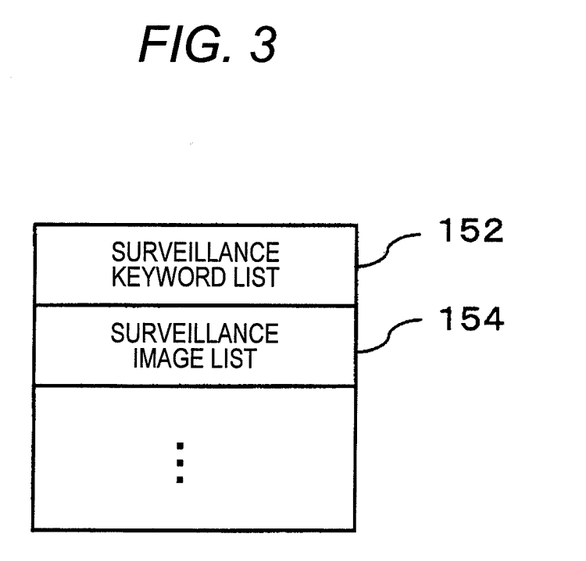
FIG. 3 is a diagram showing an example of data content stored in a keyword storage unit.

FIG. 3 shows an example of data content stored in the keyword storage unit 110. In this example, a surveillance keyword list 152 and a surveillance image list 154 are contained in the keyword storage unit 110. The surveillance keyword list 152 is a list of surveillance target keywords such as "for internal use only," "top secret," a developing code of new products, and the like. The surveillance target keywords are not limited to general keywords such as "for internal use only," and may be registered so as to meet the needs of organizations utilizing the system. The surveillance image list 154 is a list of surveillance target image elements such as marks or seals denoting that those are classified. In the case in which the image log 270 contains a surveillance target keyword or image element registered with the list 152 or 154, the image log 270 satisfies the surveillance condition.

The image log analysis unit 108 searches an image similar to a keyword in the surveillance keyword list 152 or an image element in the surveillance image list 154 from the image log 270. In order to detect a keyword, the image log analysis unit 108 applies OCR (optical character recognition) processing and a natural language analysis (for example, a morphological analysis or the like) on the image logs 270, to extract words or phrases contained in the image logs. Then, the image log analysis unit 108 finds out keywords contained in the surveillance keyword list 152 from among the extracted words or phrases. Further, the image log analysis unit 108 performs template matching by use of surveillance target image elements contained in the surveillance image list 154, for example, as templates, to examine whether or not there are image elements similar to the respective surveillance target image elements in the images of the image logs 270. In one example, an analysis result of the image log analysis unit 108 is a list of identification information on surveillance target keywords or surveillance target image elements, or both of those extracted from the image logs 270. Further, in another example, an analysis result of the image log analysis unit 108 may be a flag denoting whether or not surveillance target keywords or image elements are detected from the image logs 270. The analysis result of the image log analysis unit 108 is delivered to the registration unit 112.

Note that, the image log analysis unit 108 may use a dictionary containing more general vocabulary in place of the surveillance keyword list 152 (this dictionary contains a greater number of words and phrases than those in the surveillance keyword list 152), to extract words or phrases in the dictionary contained in the image logs 270. In this case as well, a list of the extracted words or phrases is registered with the image log analysis result 268. Note that, in the case in which a general dictionary is used in this way, an analysis result of the image logs is a list of vocabulary in the dictionary detected from among the image logs.

The registration unit 112 makes the values of the respective items in the processing logs 250 determined by the processing log analysis unit 106, the image log analysis results 268, and the image logs 270 correspond to each other, to accumulate those in the log DB 114. A set of such information (records) is registered with the log DB 114 for each image processing executed by the respective image processing apparatuses 200.

Note that, although not indispensable, tree-structured data denoting a derived relationship between document IDs may be constructed on the basis of a set membership denoted by a pair of an input document ID and an output document ID in each record, to be registered with the log DB 114. For this, for example, in accordance with registration of a new record with the log DB 114, a node having a document ID corresponding to an input document ID in the record may be searched from among nodes in the tree group contained in the tree-structured data in the log DB 114, and a value of an output document ID in the record may be appended as a child of the node. Note that the timing of appending a node to a tree is not limited thereto, and appending of a node may be carried out for each timing determined in advance such as periodic timing.

A retrieval unit 116 executes retrieval processing with respect to the log DB 114. The retrieval is executed in accordance with a retrieval condition on the basis of respective items or an image log analysis result in a processing log. As a retrieval condition, for example, there is a condition such as "a keyword of 'for internal use only' or 'top secret' is contained in an image log during the date from O—month x—day to O—month •—day," or the like. Further, a retrieval condition may be simply a condition such as "a surveillance target keyword is contained." Further, in the case in which the log record group in the log DB 114 contains a surveillance flag denoting whether or not there is a surveillance target keyword or image element in the image log 270 is contained as the image log analysis result 268, a condition of "the surveillance flag denotes 'there is (a surveillance target)'" may be a retrieval condition. A retrieval condition to be used may be designated as needed by an administrator operating the surveillance notification unit 118, or may be registered in advance with the log management apparatus 100. Note that retrieval processing based on a retrieval condition is executed in a conventional log management apparatus as well, and a conventional technique may be used. The retrieval unit 116 outputs information on each log record satisfying its retrieval condition (for example, a processing log and an image log) as a retrieval result.

The surveillance notification unit 118 receives an input of a retrieval condition from an administrator operating an administrator computer 300, to instruct the retrieval unit 116 to execute retrieval, or to notify the retrieval unit 116 of a retrieval condition set in advance to execute retrieval for each current timing set in advance. The timing of executing retrieval in the latter case may be periodic timing, for example, or may be timing every time a new log record is registered with the log DB 114. When the surveillance notification unit 118 receives a result of the retrieval from the retrieval unit 116, the surveillance notification unit 118 notifies the administrator computer 300 of the result. This notification may be carried out by use of, for example, a Web page or an e-mail.

Meanwhile, in this exemplary embodiment, the retrieval unit 116 carries out, not only conventional retrieval based on a retrieval condition, but also retrieval by use of a group of set memberships between document IDs registered with the log DB 114 (pairs of input document IDs and output document IDs). An example of a procedure of the retrieval processing by use of a set membership is shown in FIG. 4.

Figure 4:
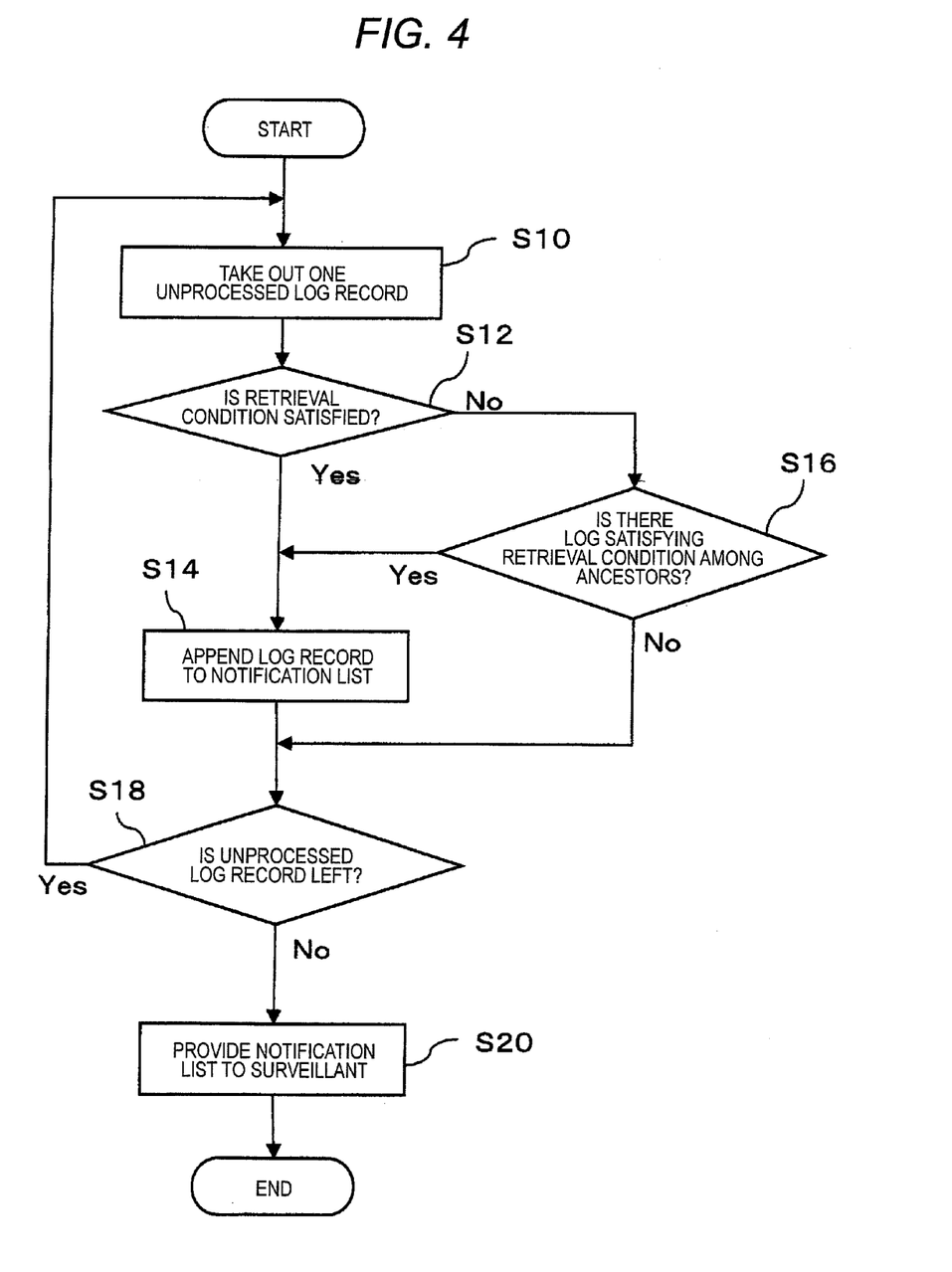
FIG. 4 is a flowchart showing an example of retrieval processing using a set membership between documents.

The procedure of FIG. 4 is executed, for example, for each current timing of executing retrieval set in advance. In this procedure, one unprocessed log record is taken out of the log DB 114 (S10), and it is judged whether or not the content of the log record satisfies the retrieval condition (S12). When it is judged that the content of the log record satisfies the retrieval condition, the log record is appended to a notification list (S14). The notification list is a list for storing log records of which an administrator is notified, and is to be blank at the point of time when the retrieval processing is started.

On the other hand, when it is judged that the content of the log record does not satisfy the retrieval condition, log records containing a document ID (which may contain it as an input document ID or as an output document ID) corresponding to an ancestor (i.e., a direct ancestor reached in the process of tracing back to its parent, a parent of its parent, a parent of the parent of its parent, and further to . . . ) of an input document ID (which may be an output document ID) in the log record, are specified, and it is judged whether or not there are log records satisfying the retrieval condition in the specified ancestral log record group (S16). When there is even one log record satisfying the retrieval condition in the ancestral log record group, a judgment result in step S16 is Yes (positive), and the retrieval unit 116 appends the log records taken out as processing objects in step S10 to the notification list (S14). In the case in which there is no log record satisfying the retrieval condition among the image logs of the log records serving as processing objects and image logs of all the log records of its ancestor (a judgment result in step S16 is No), the retrieval unit 116 does not execute step S14.

After step S14 or S16, the retrieval unit 116 judges whether or not there are unprocessed log records (S18), and when there are some unprocessed log records, the retrieval unit 116 returns to step S10, to repeat the above-described processing on the unprocessed log records. Then, when the processing on all the log records is completed, the notification list is provided to the administrator computer 300 via the surveillance processing unit 118 (S20).

The retrieval processing exemplified above may be executed to target all the records in the log DB 114, or may be executed to target records in a limited range thereof (for example, those limited to log records newly accumulated on and after the previous retrieval processing).

The administrator looks at the notification list to check whether or not fraudulent activities and the like such as information leakage by use of the image processing apparatus 200 are being committed. Note that the notification list provided to the administrator computer 300 may contain links to the retrieved respective log records or respective items thereof in place of the retrieved log records themselves. In this case, when the administrator wishes to look at further detailed information, the administrator may check the log records or the respective items therein by use of the links.

Note that, when the retrieval unit 116 periodically carries out retrieval in accordance with a fixed retrieval condition, flag information denoting whether or not the retrieval condition is satisfied may be appended to log records already inspected to satisfy or not to satisfy the retrieval condition. In this case, in subsequent retrieval processing, it suffices to examine the flag information for a log record to which flag information is appended, and there is no need to examine the content of the log record.

Figure 5:
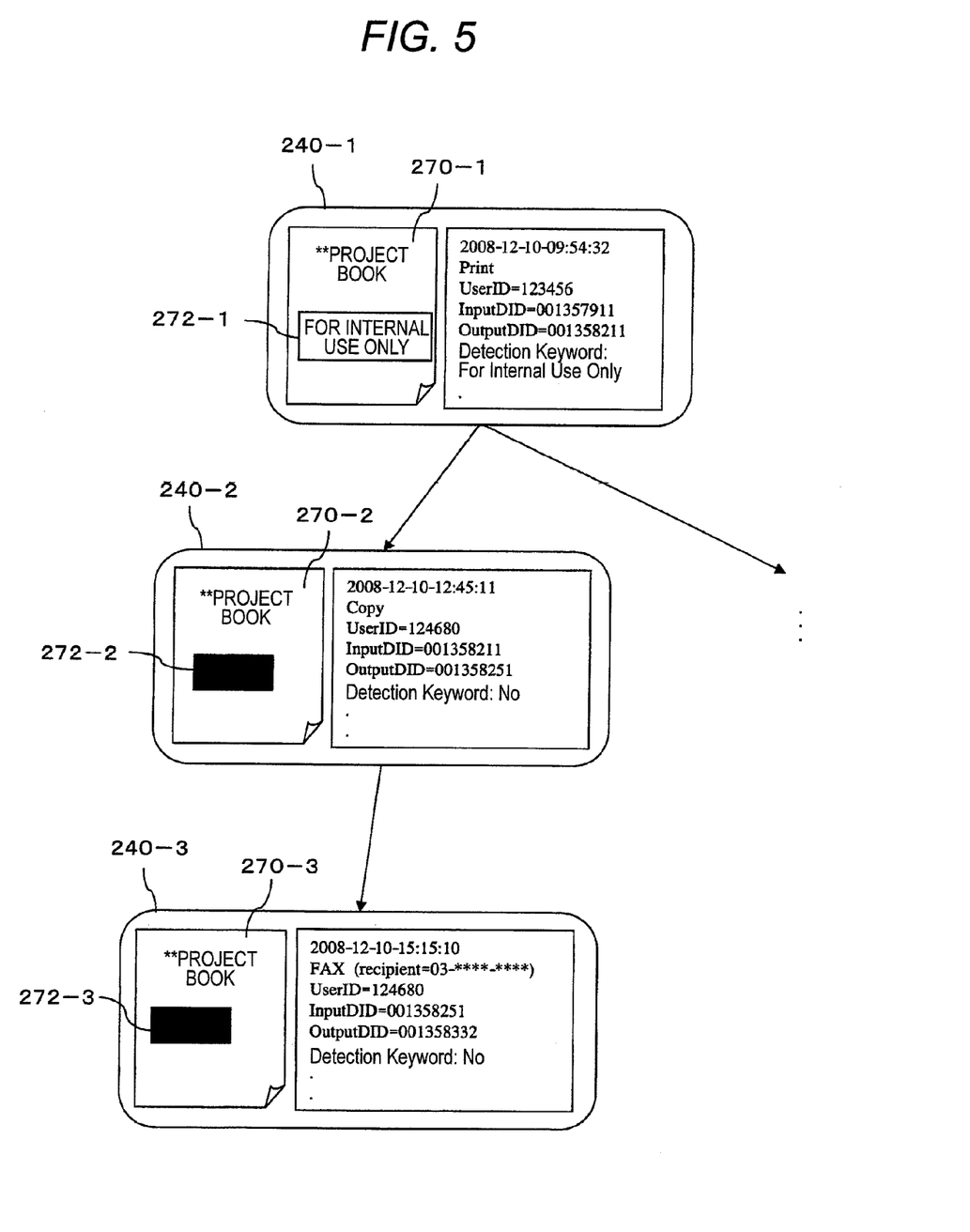
FIG. 5 is a diagram for describing that documents on which fraudulent activities or the like have been committed are detected by retrieval processing using a set membership.

In accordance with the retrieval processing exemplified above, as shown in FIG. 5, for example, it is assumed that an image element 272-1 of the surveillance target keyword "for internal use only" is contained in an image log (an input document image or an output document image) 270-1 of a log record 240-1 when a certain document is printed. This keyword is detected by the image log analysis unit 108 to be registered in the log record. Accordingly, when the retrieval condition that "for internal use only" is contained is designated, this log record is counted as a hit by retrieval. On the other hand, it is assumed that a portion showing "for internal use only" in a printed result of this document is marked out by someone, and the document is copied by one of the image processing apparatuses 200. There is a marked-out region 272-2, but there is no portion showing "for internal use only" in an image log 270-2 of a log record 240-2 of this copy. Accordingly, the log record 240-2 is not counted as a hit in accordance with only the above-described retrieval condition. However, in accordance with the procedure of FIG. 4, it is found that the log record 240-1 containing an ID of a document corresponding to the parent of the document of the log record 240-2 satisfies the retrieval condition, and therefore, this log record 240-2 as well is counted as a hit by retrieval. In the same way, in a log record 240-3 when the document which is a copied result is transmitted by a facsimile machine as well, a surveillance target image portion in an image log 270-3 is marked out (272-3). However, the log record 240-3 is counted as a hit by retrieval.

The example of FIG. 5 is the case in which the surveillance target element is marked out. However, even with respect to a document in which a surveillance target element becomes undetectable as a result of degrading an image to an extent that it is impossible to correctly recognize characters due to a repeat of copying, log records of image processings executed on the document are retrieved by the above-described procedure.

Further, in the case in which a surveillance target element is contained on only a certain page (for example, the first page) of a document composed of a plurality of pages, copying or facsimile transmission of the document may be carried out after that page is extracted therefrom in some cases. In this exemplary embodiment, the present invention can also be applied to a case in which such a page containing a surveillance target is extracted. In this case, the ID appending unit 204 of the image processing apparatus 200 appends a document ID to all the pages of the output document. Then, the image processing apparatus 200 detects a document ID of respective pages of an input document, and when no surveillance target element is detected from any page of the input document, the image processing apparatus 200 examines log records corresponding to an ancestral document ID of the document ID. If any of the found ancestral documents contains the surveillance target element, the input document is counted as a hit by retrieval.

Next, a modification will be described. The exemplary embodiment of FIG. 1 is to retrieve the log record groups accumulated in the log DB 114 in an ex-post facto manner. In contrast thereto, in this modification, an input document input for image processing is inspected, and in the case in which the input document contains a surveillance target element, countermeasure processing such as prohibition of the execution of image processing is executed.

Figure 6:
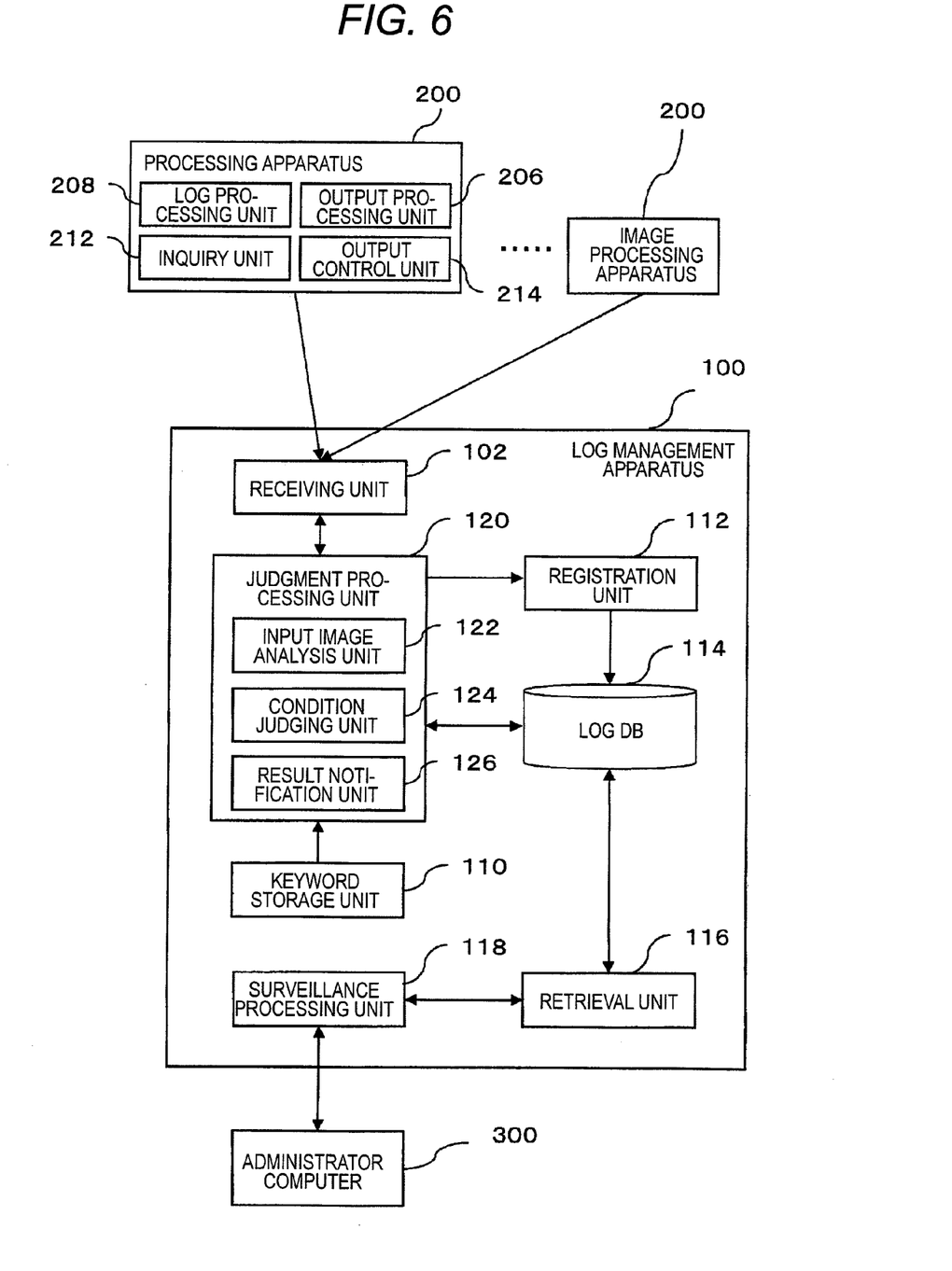
FIG. 6 is a diagram showing an example of a system configuration of a modification.

An example of a system in this modification is shown in FIG. 6. In this example, the image processing apparatus 200 includes an inquiry unit 212 and an output control unit 214 in addition to the output processing unit 206 and the log notification unit 208 (described already). When the inquiry unit 212 receives an instruction to execute image processing from a user, the inquiry unit 212 transmits an inquiry as to whether or not the image processing is permitted to be executed to the log management apparatus 100. This inquiry contains an image of the input document input as an object of the image processing. Further, an ID of the user issuing the instruction to execute the image processing or attribute information such as a type of the image processing instructed to execute may be contained in the inquiry. Note that the output control unit 214 makes the output processing unit 206 suspend execution of the image processing (or an output of a processing result) until a response is made as to permission or prohibition to this inquiry from the log management apparatus 100.

Figure 7:
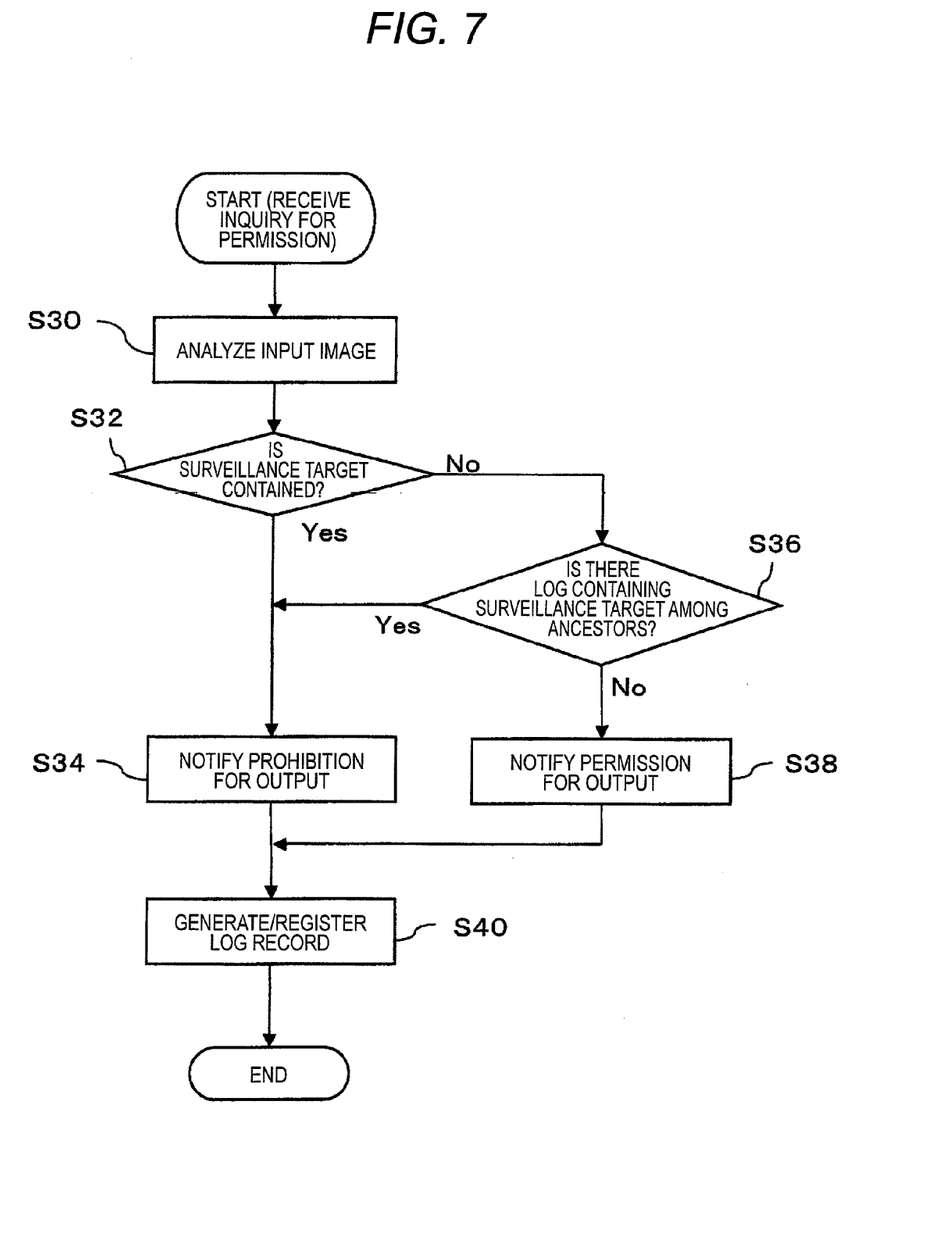
FIG. 7 is a flowchart showing an example of a processing procedure of the modification.

In the log management apparatus 100 receiving the inquiry, a judgment processing unit 120 judges whether or not the image processing is permitted with respect to the inquiry. An example of the processing of the judgment processing unit 120 is shown in FIG. 7. In this procedure, when an inquiry is received, first, an input image analysis unit 122 analyzes an image of an input document contained in the inquiry (S30), and judges whether or not a surveillance target element (a keyword or an image) registered with the keyword storage unit 110 is contained in the image (S32). This analysis processing may be the same as the processing of the image log analysis unit 108. When the input image analysis unit 122 judges that a surveillance target is contained in the input document, a result notification unit 126 returns a notification of prohibiting output processing to the image processing apparatus 200 (S34). In the image processing apparatus 200 receiving this notification, the output control unit 214 instructs the output processing unit 206 to cancel the suspended image processing. Thereby, the execution of the image processing is canceled. The log notification unit 208 transmits log information containing the information of canceling the image processing to the log management apparatus 100. In the log management apparatus 100, the registration unit 112 registers the log information with the log DB 114 (S40). Note that, because some of the log items registered with the log DB 114 are contained in the inquiry transmitted by the inquiry unit 212, it suffices for the log notification unit 208 to transmit only items, which are not contained in the inquiry.

When it is judged that there is no surveillance target element in the input document in step S32, a condition judging unit 124 traces back toward its ancestors along the tree structure of set memberships between document IDs registered with the log DB 114 from a document ID contained in the input document as a starting point, to specify log records of its ancestral document. Then, when there are log records having image logs containing the surveillance target element in the specified ancestral log record group (the judgment result in S36 is Yes), the result notification unit 126 returns a notification of prohibiting output processing to the image processing apparatus 200 (S34). On the other hand, when there is no document corresponding to the image log having the surveillance target element in the ancestors of the input document (the judgment result in S36 is No), the result notification unit 126 returns a notification of permitting output processing to the image processing apparatus 200 (S38). In response to the notification, the output control unit 214 of the image processing apparatus permits the output processing unit 206 to execute the suspended image processing (or an output of a processing result). Thereby, an output document as a result of the image processing is output, and the log notification unit 208 transmits the log information on the processing to the log management apparatus 100. In the log management apparatus 100, the registration unit 112 registers the log information with the log DB 114 (S40).

Figure 1:
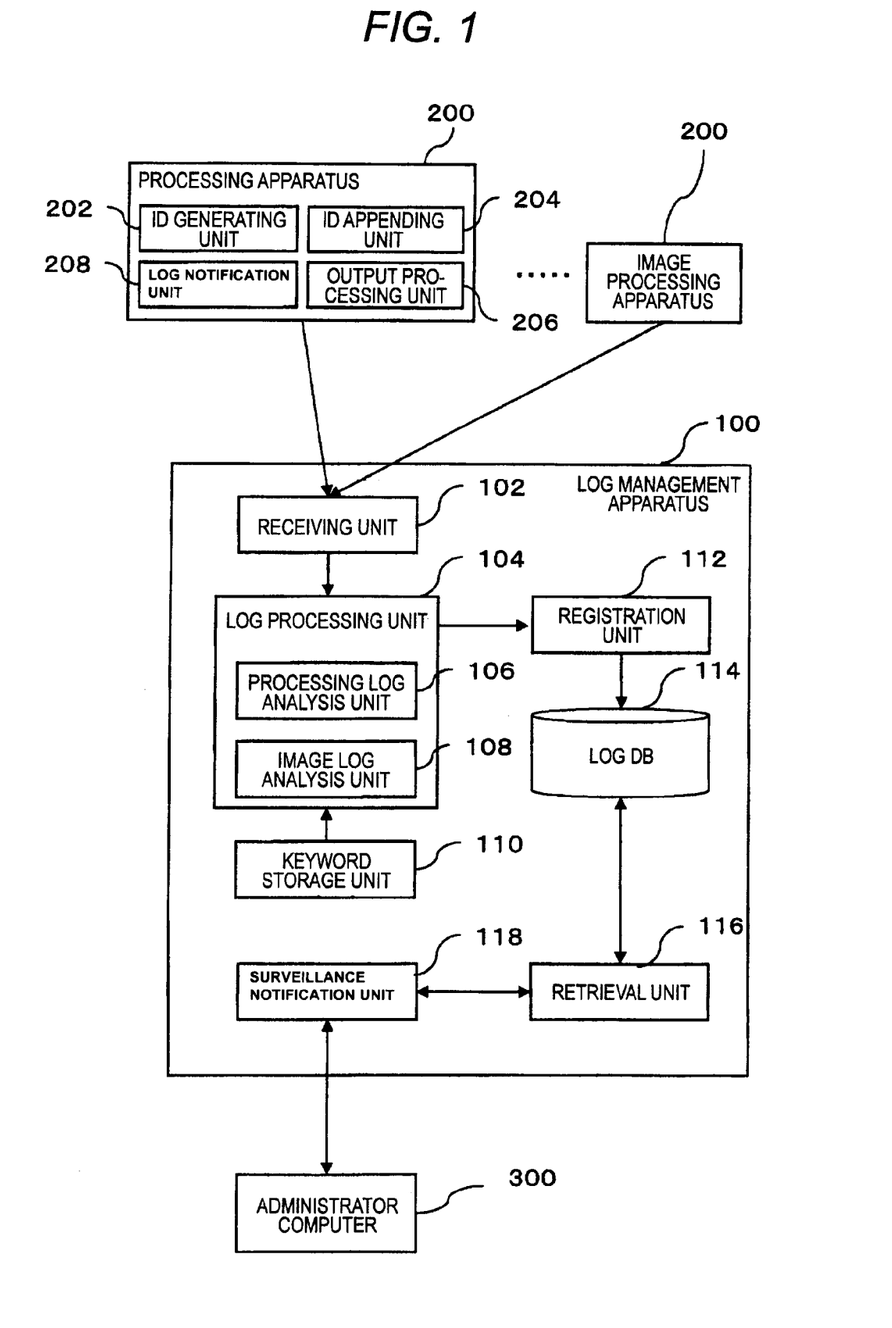
FIG. 1 is a diagram showing an example of a system configuration of an exemplary embodiment.
Figure 2:
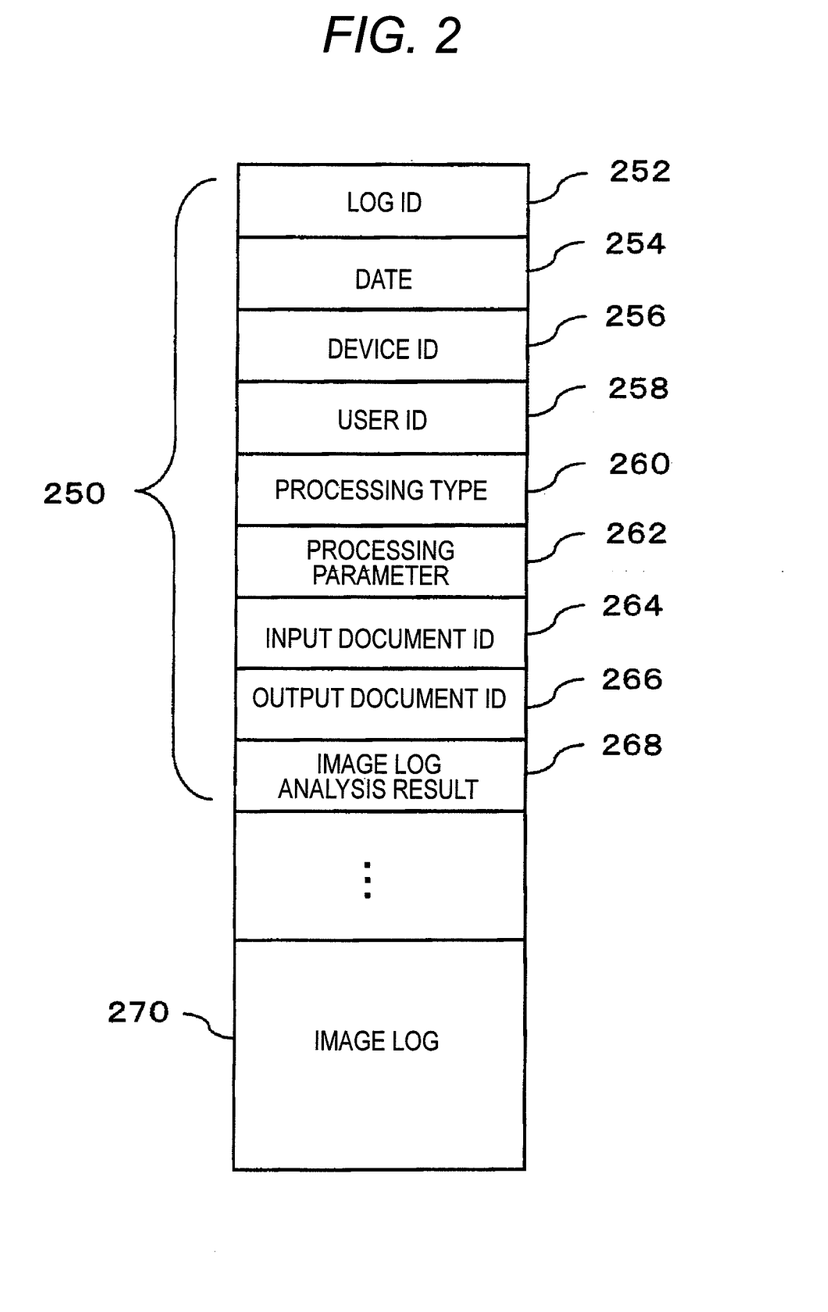
FIG. 2 is a diagram showing an example of data content of a log record.

It suffices for the surveillance processing unit 118 and the retrieval unit 116 to execute the same processing as in the exemplary embodiment of FIG. 1.

In the example of FIG. 7, it is judged whether or not the image processing is permitted or prohibited depending on whether or not the image of the document contains the surveillance target element. However, the judgment may be carried out further in view of conditions for attributes associated with image processing such as a type of image processing, a user ID, and the like. For example, it is possible to set a condition such that, in the case in which an input document contains a surveillance target element, and a type of image processing is facsimile transmission, and its destination is outside of a company, the facsimile transmission is prohibited. In the example of this condition, in the case in which the execution of facsimile transmission to a destination outside of a company is instructed, even when a surveillance target element is not contained in an input document serving as an object of the processing, if an ancestor of the document contains the surveillance target element, the facsimile transmission processing is prohibited.

Note that the countermeasure processing executed on the basis of an analysis result of an input document is not limited to the control to permit/prohibit the execution of image processing as described above. In place of the processing, for example, processing for permitting the execution of image processing regardless of whether or not an input document or an ancestor thereof satisfies its surveillance condition, and for notifying an administrator of that when the image processing satisfying the surveillance condition is executed, may be executed as countermeasure processing.

Figure 8:
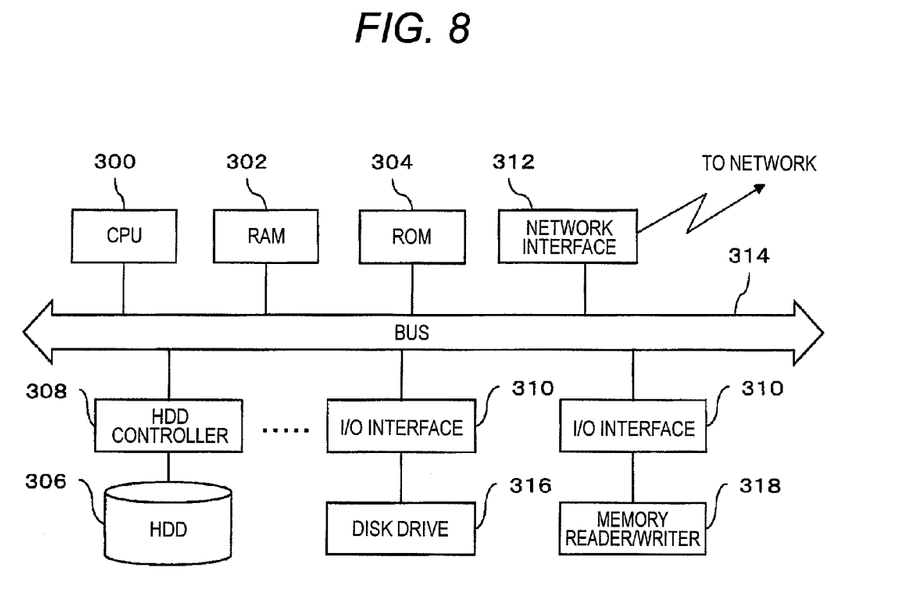
FIG. 8 is a diagram showing an example of a hardware configuration of a computer.

In an example, the log management apparatus 100, the control unit of the image processing apparatus 200, and the administrator computer 300 as described above are realized by making a general-purpose computer execute a program describing the above-described processing. Here, as shown in FIG. 8, for example, the computer has a circuit configuration as hardware in which a microprocessor 300 such as a CPU, memories (primary storages) such as a random access memory (RAM) 302 and a read-only memory (ROM) 304, an HDD 306 connected via an HDD (hard disk drive) controller 308, various types of I/O (input/output) interfaces 310, and the like are connected via a bus 314, for example. A network interface 312 for connecting to a network such as a local area network may be connected to the bus 314. Further, to the bus 314, for example, a disk drive 316 for reading and/or writing onto portable disk recording media such as CDs, DVDs, and the like, a memory reader/writer 318 for reading and/or writing onto portable nonvolatile recording media according to various types of standards such as a flash memory, and the like may be connected via the I/O interfaces 310. The program in which the processing contents of the respective functional modules exemplified above are described is stored in a permanent memory such as the hard disk drive 306 via a recording medium such as a CD or a DVD, or a communication method such as a network, to be installed in the computer. The program stored in the permanent memory is read out by the RAM 302 to be executed by the microprocessor 300 such as a CPU, which realizes the functional module group exemplified above.

Note that the system configuration shown in FIG. 1 or FIG. 6 is just one example. For example, sharing of functions among the log management apparatus 100, the image processing apparatus 200, and the administrator computer 300 is not limited to that shown in FIG. 1 or FIG. 6. For example, various modifications are possible so as to have a configuration in which the log management apparatus 100 provides a document ID for an output document, or so as to provide the function of the log processing unit 104 to the image processing apparatus 200.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image processing system comprising:
a detection unit that detects document identification information from an input document;
an output unit that executes image processing on the input document, and appends unique document identification information to an output document serving as an execution result of the image processing, to output the output document;
a storage unit that stores history information of the image processing, wherein the history information contains (i)set-membership information containing the document identification information of the input document and the document identification information of the output document, and (ii) an image of the input document or an image of the output document, or both of the images; and
a notification unit that, when history information in which a surveillance target element is contained in an image of an input document or an image of an output document is detected from the storage unit, notifies a notified party determined in advance of the detected history information or information which indicates the history information is detected,
wherein ancestral documents are specified based on the set-membership information contained in other respective pieces of history information stored in the storage unit, and
even in the case in which the surveillance target element is not contained in both of the image of the input document and the image of the output document in the history information, and when it is identified that at least one of the ancestral documents of the input document has the surveillance target element, the notification unit notifies the notified party of the history information or the information that indicates the history information is detected, wherein the ancestral documents are specified based on the set-membership information contained in the stored history information, and the input document is identified, according to execution of image processing on one of the ancestral documents, as an output document with respect to the one of the ancestral documents, and the document identification information of the input document is the unique document identification information appended to the output document with respect to the one of the ancestral documents, according to the execution of the image processing on said one of the ancestral documents.

2. The image processing system according to claim 1, wherein the history information contains both the image of the input document and the image of the output document.

3. The image processing system according to claim 1, wherein the history information contains both the image of the input document and the image of the output document.

4. The image processing system of claim 1, wherein a relationship between at least one of the ancestral documents and the input document is a parent node and child node relationship in a data tree structure.

5. A history management apparatus comprising:
- a storage unit that stores history information which contains (i) set-membership information containing document identification information of an input document serving as an object of the image processing, and document identification information of an output document serving as a result of the image processing, and (ii) an image of the input document or an image of the output document, or both of the images, as history information of the image processing; and
- a notification unit that, when history information in which a surveillance target element is contained in an image of an input document or an image of an output document is detected from the storage unit, notifies a notified party determined in advance of the detected history information or information which indicates the history information is detected, wherein ancestral documents are specified based on the set-membership information contained in other respective pieces of history information stored in the storage unit, and even in the case in which the surveillance target element is not contained in both of the image of the input document and the image of the output document in the history information, and when it is identified that at least one of the ancestral documents of the input document has the surveillance target element, the notification unit notifies the notified party of the history information or the information that indicates the history information is detected, wherein the ancestral documents are specified based on the set-membership information contained in the stored history information, and the input document is identified, according to execution of image processing on one of the ancestral documents, as an output document with respect to the one of the ancestral documents, and the document identification information of the input document is unique document identification information appended to the output document with respect to the one of the ancestral documents, according to the execution of the image processing on said one of the ancestral documents.

6. The history management apparatus of claim 5, wherein the history information contains both the image of the input document and the image of the output document.

7. The history management apparatus of claim 5, wherein the history information contains both the image of the input document and the image of the output document.

8. The history management apparatus of claim 5, wherein a relationship between at least one of the ancestral documents and the input document is a parent node and child node relationship in a data tree structure.

9. A non-transitory computer readable medium storing a program causing a computer to execute a process for a history management, the process comprising:

storing history information which contains (i) set-membership information containing document identification information of an input document serving as an object of the image processing, and document identification information of an output document serving as a result of the image processing, and (ii) an image of the input document or an image of the output document, or both of the images, as history information of the image processing; and notifying, when history information in which a surveillance target element is contained in an image of an input document or an image of an output document is detected from the stored history information, a notified party determined in advance of the detected history information or information which indicates the history information is detected, wherein ancestral documents are specified based on the set-membership information contained in other respective pieces of stored history information, and even in the case in which the surveillance target element is not contained in both of the image of the input document and the image of the output document in the history information, and when it is identified that at least one of the ancestral documents of the input document has the surveillance target element, the notifying step notifies the notified party of the history information or the information that indicates the history information is detected, wherein the ancestral documents are specified based on the set-membership information contained in the stored history information, and the input document is identified, according to execution of image processing on one of the ancestral documents, as an output document with respect to the one of the ancestral documents, and the document identification information of the input document is unique document identification information appended to the output document with respect to the one of the ancestral documents, according to the execution of the image processing on said one of the ancestral documents.

10. The non-transitory computer readable medium of claim 9, wherein the history information contains both the image of the input document and the image of the output document.

11. The non-transitory computer readable medium of claim 9, wherein the history information contains both the image of the input document and the image of the output document.

12. The non-transitory computer readable medium of claim 9, wherein a relationship between at least one of the ancestral documents and the input document is a parent node and child node relationship in a data tree structure.

13. An image processing system comprising:
a detection unit that detects document identification information from an input document;
an output unit that executes image processing on the input document, and appends unique document identification information to an output document serving as an execution result of the image processing, to output the output document;
a storage unit that stores history information which contains set-membership information containing the document identification information of the input document and the document identification information of the output document, as history information of the image processing; and
a countermeasure processing unit that executes countermeasure processing determined in advance when it is identified that a surveillance target element is contained in an image of the input document before executing the image processing in the case in which image processing on the input document is instructed,
wherein ancestral documents are specified based on the set-membership information contained in other respective pieces of history information stored in the storage unit, and
even in the case in which the surveillance target element is not contained in the image of the input document, when it is identified that at least one of the ancestral documents has the surveillance target element, the countermeasure processing unit executes the countermeasure processing,
wherein the ancestral documents are specified based on the set-membership information contained in the stored history information, and
the input document is identified, according to execution of image processing on one of the ancestral documents, as an output document with respect to the one of the ancestral documents, and
the document identification information of the input document is the unique document identification information appended to the output document with respect to the one of the ancestral documents, according to the execution of the image processing on said one of the ancestral documents.

14. The image processing system according to claim 13, wherein the history information contains both the image of the input document and the image of the output document.

15. The image processing system according to claim 13, wherein the history information contains both the image of the input document and the image of the output document.

16. The image processing system of claim 13, wherein a relationship between at least one of the ancestral documents and the input document is a parent node and child node relationship in a data tree structure.

17. An image processing control apparatus comprising:
a storage unit that stores history information which contains set-membership information containing document identification information of an input document serving as an object of the image processing, and document identification information of an output document serving as a result of the image processing, as history information of the image processing; and
a countermeasure processing unit that executes countermeasure processing determined in advance when it is identified that a surveillance target element is contained in an image of the input document before executing the image processing in the case in which image processing on the input document is instructed,
wherein ancestral documents are specified based on the set-membership information contained in other respective pieces of history information stored in the storage unit, and
even in the case in which the surveillance target element is not contained in the image of the input document, when it is identified that at least one of the ancestral documents has the surveillance target element, the countermeasure processing unit executes the countermeasure processing,
wherein the ancestral documents are specified based on the set-membership information contained in the stored history information, and
the input document is identified, according to execution of image processing on one of the ancestral documents, as an output document with respect to the one of the ancestral documents, and
the document identification information of the input document is unique document identification information appended to the output document with respect to the one of the ancestral documents, according to the execution of the image processing on said one of the ancestral documents.

18. The history management apparatus of claim 17, wherein the history information contains both the image of the input document and the image of the output document.

19. The history management apparatus of claim 13, wherein the history information contains both the image of the input document and the image of the output document.

20. The history management apparatus of claim 17, wherein a relationship between at least one of the ancestral documents and the input document is a parent node and child node relationship in a data tree structure.

* * * * *